United States Patent
Sutar et al.

(10) Patent No.: US 10,947,698 B2
(45) Date of Patent: Mar. 16, 2021

(54) LOW-PROFILE MACHINE CABIN

(71) Applicant: Caterpillar Inc., Peoria, IL (US)

(72) Inventors: Nilesh Ajit Sutar, Dunlap, IL (US); Aaron Dunaway, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 93 days.

(21) Appl. No.: 16/438,692

(22) Filed: Jun. 12, 2019

(65) Prior Publication Data
US 2020/0392699 A1 Dec. 17, 2020

(51) Int. Cl.
| B60J 7/00 | (2006.01) |
| E02F 9/16 | (2006.01) |
| B62D 33/06 | (2006.01) |
| B60H 1/00 | (2006.01) |
| E02F 9/08 | (2006.01) |
| E02F 3/76 | (2006.01) |

(52) U.S. Cl.
CPC ............ *E02F 9/16* (2013.01); *B60H 1/00535* (2013.01); *B60H 1/00564* (2013.01); *B62D 33/0617* (2013.01); *E02F 3/7636* (2013.01); *E02F 9/0858* (2013.01)

(58) Field of Classification Search
CPC ............... A47B 83/001; E01F 15/143; E04B 2002/7488; E04B 2002/7483; E04B 2/7433; B60H 2001/00235; B60H 1/00021; B60H 1/00378; B62D 33/0617; B61D 15/06
See application file for complete search history.

(56) References Cited

U.S. PATENT DOCUMENTS

| RE29,123 | E | * | 1/1977 | Malm | ................... B60R 21/131 296/35.1 |
| 6,065,799 | A | * | 5/2000 | Suwabe | ............. B62D 33/0636 180/89.12 |
| 6,206,457 | B1 | * | 3/2001 | Sakyo | .................... B62D 21/09 296/190.08 |
| 6,561,572 | B1 | * | 5/2003 | Martin, Jr. | ......... B62D 33/0621 296/190.1 |
| 7,246,846 | B2 | * | 7/2007 | Shioji | ..................... E02F 9/163 180/89.12 |
| 7,537,074 | B2 | * | 5/2009 | Ishii | ................... B60H 1/00378 180/89.12 |
| D605,207 | S | * | 12/2009 | Menges | ......................... D15/30 |
| 8,152,226 | B2 | * | 4/2012 | Iwakata | ............. B62D 33/0617 296/190.1 |
| D686,643 | S | * | 7/2013 | Kinoshita | ...................... D15/30 |
| 8,485,589 | B2 | * | 7/2013 | Obe | .................... B62D 33/0604 296/190.09 |
| 8,579,363 | B2 | * | 11/2013 | Davis | ..................... E02F 9/166 296/190.03 |

(Continued)

*Primary Examiner* — Kiran B Patel
(74) *Attorney, Agent, or Firm* — Harrity & Harrity LLP

(57) ABSTRACT

A cabin for a machine is disclosed. The cabin may include a floor, a roof, at least one A-post located at a leading end relative to a forward travel direction of the machine, and a C-post located at a trailing end opposite the at least one A-post. The C-post may have first terminal ends located at the floor and second terminal ends located at the roof. The C-post may include a C-shaped beam having the first terminal ends, and a Y-shaped beam structure having the second terminal ends. The Y-shaped beam structure may extend from the C-shaped beam to the roof. The Y-shaped beam structure may include two spaced beams.

20 Claims, 5 Drawing Sheets

(56) References Cited

U.S. PATENT DOCUMENTS

| | | | |
|---|---|---|---|
| 8,702,154 B1* | 4/2014 | Gielda | B62D 33/0617 |
| | | | 296/190.03 |
| D707,728 S* | 6/2014 | Imashige | D15/30 |
| D721,742 S* | 1/2015 | Lee | D15/30 |
| 8,926,003 B2 | 1/2015 | Gielda et al. | |
| 9,033,402 B2* | 5/2015 | Salvini | B60J 7/16 |
| | | | 296/190.03 |
| D734,369 S* | 7/2015 | Miller | D15/30 |
| 9,133,603 B2* | 9/2015 | Kim | E02F 9/163 |
| 9,346,495 B2 | 5/2016 | Zurinski et al. | |
| 9,797,113 B2* | 10/2017 | Tolkacz | E02F 3/7636 |
| 9,995,069 B2 | 6/2018 | Ghantous et al. | |
| 2005/0156422 A1* | 7/2005 | Della Valle | B60R 21/131 |
| | | | 280/756 |
| 2007/0044492 A1* | 3/2007 | Ichikawa | B60H 1/00378 |
| | | | 62/239 |
| 2007/0145780 A1* | 6/2007 | Tecklenburg | B62D 29/043 |
| | | | 296/190.08 |
| 2010/0314908 A1* | 12/2010 | Wood, Jr. | B62D 33/0617 |
| | | | 296/190.03 |
| 2014/0217778 A1* | 8/2014 | Gielda | B62D 33/0617 |
| | | | 296/190.03 |
| 2014/0217779 A1* | 8/2014 | Gielda | B60R 21/13 |
| | | | 296/190.03 |
| 2015/0298749 A1* | 10/2015 | Zurinski | E02F 9/163 |
| | | | 296/190.08 |
| 2016/0039262 A1* | 2/2016 | Gielda | B60H 1/00207 |
| | | | 296/190.09 |
| 2016/0152284 A1 | 6/2016 | Wiese et al. | |
| 2019/0118631 A1* | 4/2019 | Yamamoto | B62D 25/20 |
| 2020/0079175 A1* | 3/2020 | Fiocchi | B60H 1/00564 |
| 2020/0164723 A1* | 5/2020 | Ferri | B60H 1/00735 |

\* cited by examiner

LOW-PROFILE MACHINE CABIN

TECHNICAL FIELD

The present disclosure relates generally to a machine cabin and, for example, to a low-profile machine cabin.

BACKGROUND

An earth working or construction-type machine, such as a motor grader, may include a cabin from which an operator controls movement of the machine and associated work tools of the machine. The cabin shields the operator from harsh environmental conditions and protects the operator from injury in case of machine rollover.

A typical machine cabin is formed from a floor, a roof, and upright posts that extend between the floor and the roof. A post is classified into one of three categories, depending on the post's location and function within the cabin. A cabin typically includes A-posts, B-posts, and C-posts. A-posts are generally located at the front corners of the operator cabin, while C-posts are located at the rear corners of the cabin. A windshield is mounted between the A-posts, and a back wall and/or rear window is mounted between the C-posts. B-posts are located between the A-posts and the C-posts (i.e., at the sides of the cabin) and are used for mounting doors of the cabin.

A particular configuration of the posts may be critical for providing machine rollover protection for the cabin that meets safety standards. However, in some cases the configuration may reduce visibility from the cabin and prevent the operator from viewing critical areas surrounding the machine.

One attempt at a cabin that provides enhanced operator visibility is disclosed in U.S. Pat. No. 9,346,495 that issued to Caterpillar Inc. on May 24, 2016 ("the '495 patent"). In particular, the '495 patent discloses a cabin that includes a C-post having two terminal ends located at a floor of the cabin and a single terminal end located at a roof of the cabin. The C-post may be fabricated from two parallel spaced-apart beams to form a recess where an air handling duct may be mounted. The '495 patent also indicates that the duct may be configured to direct cabin air to a heating, ventilation, and air conditioning (HVAC) unit located on top of the roof.

The machine cabin of the present disclosure solves one or more of the problems set forth above and/or other problems in the art.

SUMMARY

According to some implementations, a cabin for a machine may include a floor; a roof; at least one A-post located at a leading end relative to a forward travel direction of the machine; and a C-post located at a trailing end opposite the at least one A-post, the C-post having first terminal ends located at the floor and second terminal ends located at the roof. The C-post may include a C-shaped beam having the first terminal ends, and a Y-shaped beam structure having the second terminal ends. The Y-shaped beam structure may extend from the C-shaped beam to the roof, and the Y-shaped beam structure may include two spaced beams.

According to some implementations, a machine may include a cabin including a floor, a roof, at least one A-post located at a leading end relative to a forward travel direction of the machine, and a C-post, the C-post located at a trailing end opposite the at least one A-post. The C-post may have first terminal ends located at the floor and second terminal ends located at the roof. The C-post may include a C-shaped beam having the first terminal ends, and a Y-shaped beam structure having the second terminal ends. The Y-shaped beam structure may extend from the C-shaped beam to the roof.

According to some implementations, a motor grader may include a floor; a roof; and a C-post located at a trailing end relative to a forward travel direction of the motor grader, the C-post having first terminal ends located at the floor and second terminal ends located at the roof. The C-post may include a C-shaped beam having the first terminal ends, and a Y-shaped beam structure having the second terminal ends. The Y-shaped beam structure may extend from the C-shaped beam to the roof. The Y-shaped beam structure may include two spaced beams and an air duct located between the two spaced beams.

DETAILED DESCRIPTION

Figure 1:
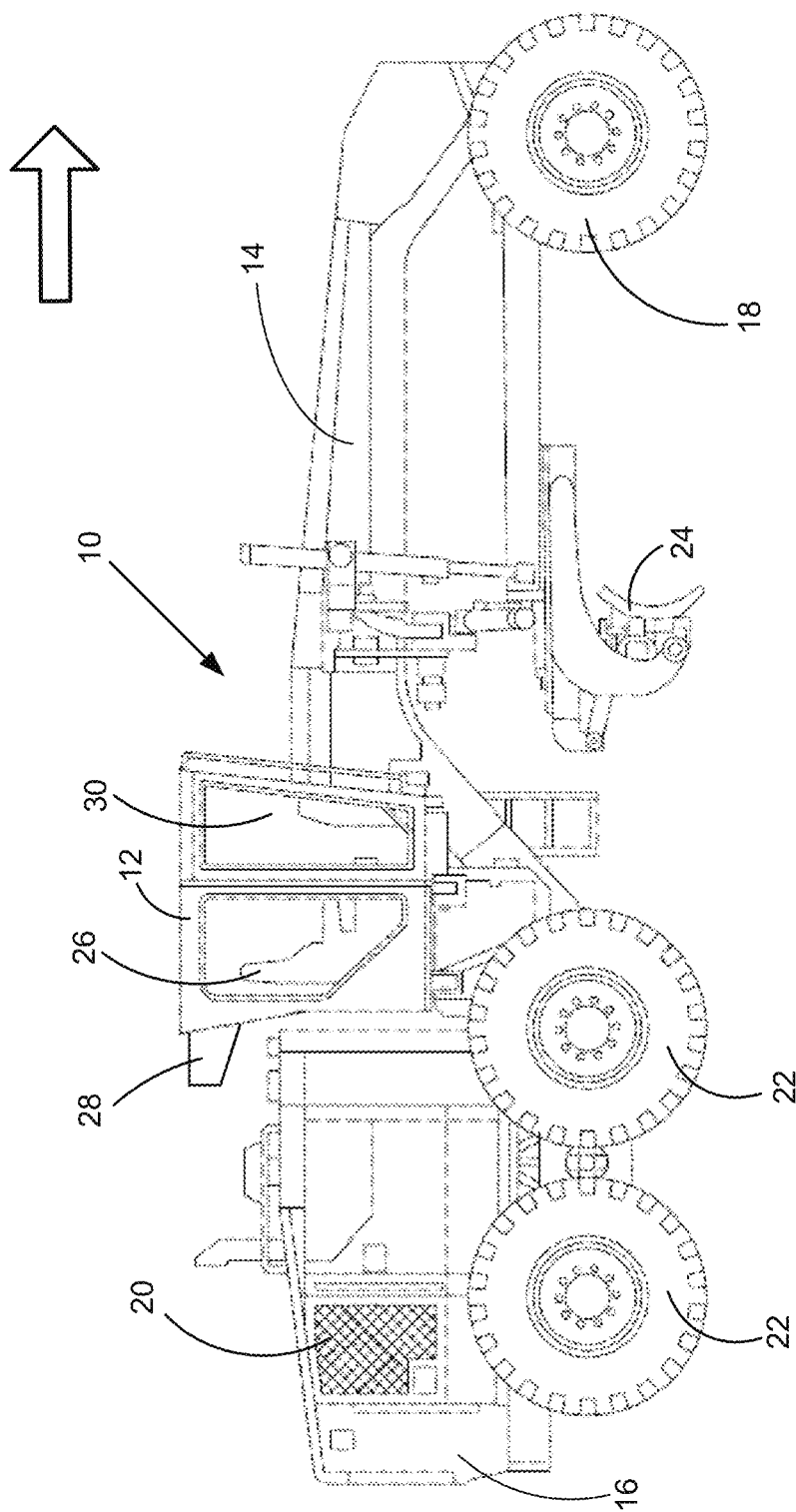
FIG. 1 is a diagram of an example machine that includes a cabin.

FIG. 1 is a diagram of an example machine 10 having an exemplary cabin 12, from which an operator may control movements of machine 10. In the example of FIG. 1, machine 10 is a motor grader. However, machine 10 may embody another type of earthmoving and/or construction machine, such as an excavator, a wheel loader, an agricultural tractor, a dozer, and/or the like.

As a motor grader, machine 10 may include a steerable front frame 14 and a driven rear frame 16 that is pivotally connected to front frame 14. Front frame 14 may include a pair of front wheels 18 (or other traction devices), and support cabin 12. Rear frame 16 may include compartments 20 for housing a power source (e.g., an engine) and associated cooling components, the power source being operatively coupled to rear wheels 22 (or other traction devices) for primary propulsion of machine 10. Rear wheels 22 may be arranged in tandems on opposing sides of rear frame 16. Steering of machine 10 may be a function of both front wheel steering and articulation of front frame 14 relative to rear frame 16.

Machine 10 may also include one or more ground engaging tools such as, for example, a drawbar-circle-moldboard (DCM) 24 that is operatively connected to and supported by front frame 14. DCM 24 may be movable via a hydraulic ram arrangement configured to shift DCM 24 vertically toward and away from front frame 14, shift DCM 24 side-to-side, and/or rotate DCM 24 about a horizontal or vertical axis.

Cabin 12 may house components configured to receive input from a machine operator indicative of a desired machine and/or work tool movement. Specifically, cabin 12 may house one or more input devices (not shown), such as single or multi-axis joysticks located proximal a seat 26. The input devices may be proportional-type controllers configured to position or orient machine 10 and/or the ground engaging tools by producing position signals indicative of desired speeds and/or forces in a particular direction. Cabin 12 also may include an HVAC unit 28 mounted at an exterior of cabin 12. For example, HVAC unit 28 may be located at a rear wall of cabin 12. HVAC unit 28 may provide heating, cooling, and related air conditioning to an interior of cabin 12. The operator of machine 10 may gain access to cabin 12 by way of a door 30 located at a side of cabin 12.

As indicated above, FIG. 1 is provided as an example. Other examples may differ from what is described in connection with FIG. 1.

Figure 2:
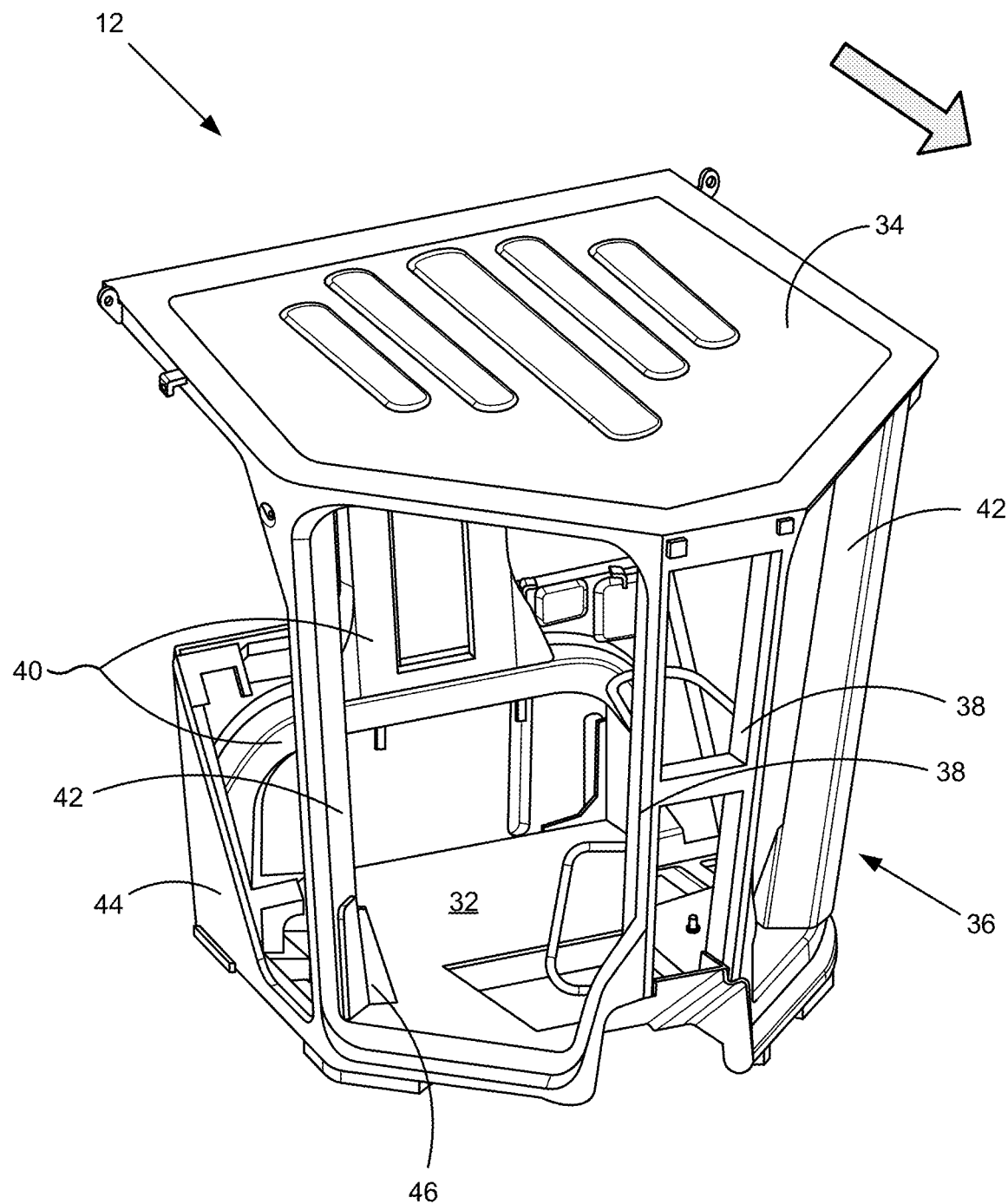
FIG. 2 is a diagram of an example cabin that may be used with the machine of FIG. 1.

FIG. 2 is a diagram of an example cabin 12 that may be used with machine 10. As shown in FIG. 2, cabin 12 may include a floor 32, a roof 34, and a frame 36 that includes a plurality of upright posts that extend from floor 32 to roof 34. Floor 32 may be a planar panel having a recess through which a pedal assembly (not shown) may extend. Roof 34 also may be a planar panel. In some implementations, HVAC unit 28 is not mounted to an upper surface of roof 34.

The posts may include two A-posts 38 located at a leading end of cabin 12 relative to a forward travel direction of machine 10, a C-post 40 located at an opposing trailing end of cabin 12, and two B-posts 42 located between A-posts 38 and C-post 40 at opposing sides of cabin 12. The posts may define frame 36, to which one or more doors (not shown in FIG. 2) and/or one or more windows (not shown in FIG. 2) may be attached. For example, a door may be attached between an A-post 38 and a B-post 42, a window may be attached between a B-post 42 and C-post 40, a window may be attached between A-posts 38, and/or the like. In addition, cabin 12 may include a body panel 44 that may provide a back wall of cabin 12 and side walls, or portions thereof, on opposing sides of cabin 12. In some implementations, body panel 44 may include floor 32.

A post (e.g., an A-post 38, a B-post 42, and/or a C-post 40) may have a first terminal end that is attached to floor 32 (e.g., by welding) and a second terminal end that is attached to roof 34 (e.g., by welding). One or more brackets 46 may be attached to the post and floor 32 so as to span an angle between the post and floor 32. Similarly, one or more brackets 46 may be attached to the post and roof 34 so as to span an angle between the post and roof 34. A post (e.g., an A-post 38, a B-post 42, and/or a C-post 40) may be oriented vertically (e.g., orthogonal to a plane defined by floor 32 and/or a plane defined by roof 34). Alternatively, the post may be angled outward from floor 32 to roof 34 such that roof 34 has a larger area than floor 32 and overhangs floor 32.

As indicated above, FIG. 2 is provided as an example. Other examples may differ from what is described in connection with FIG. 2.

Figure 3:
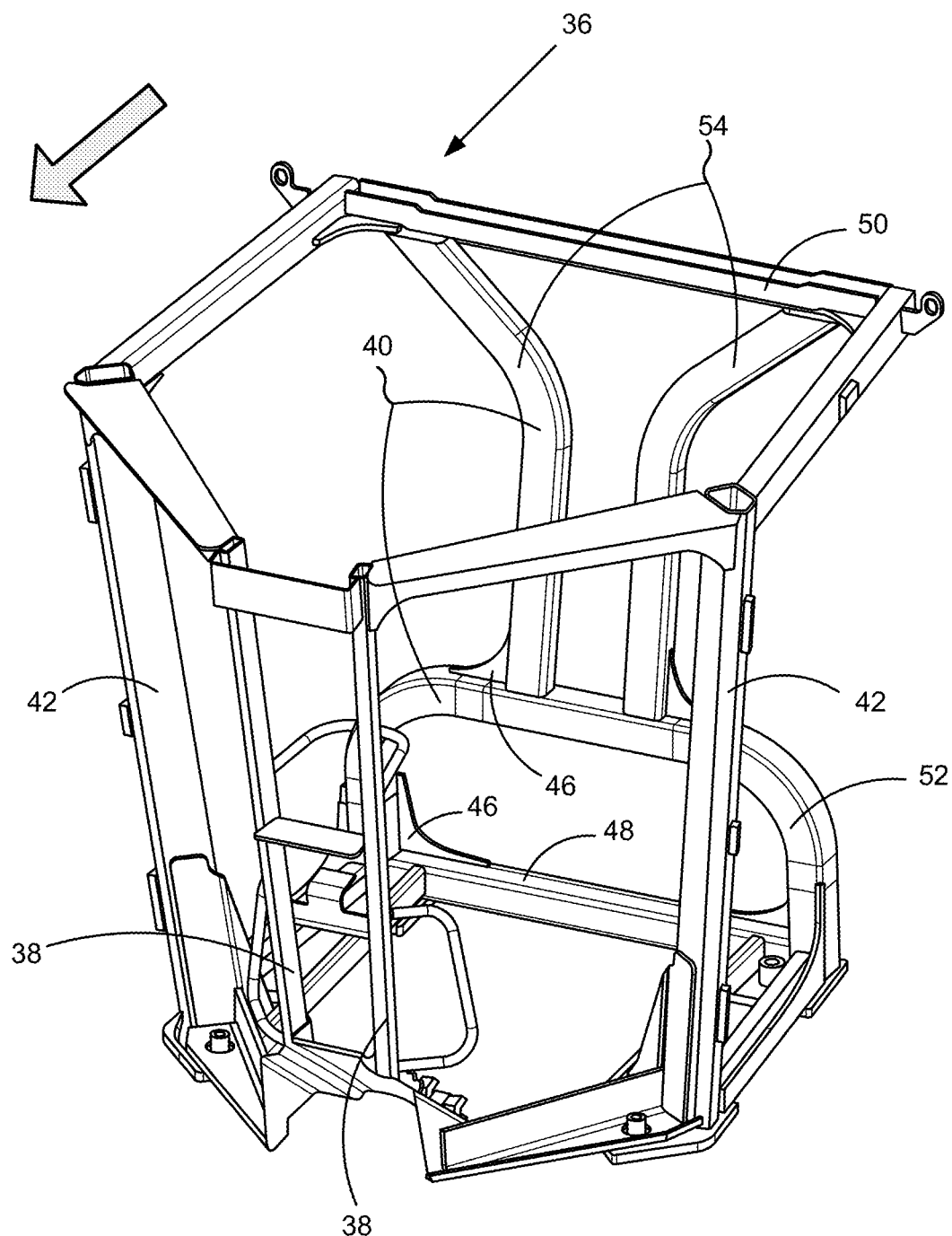
FIG. 3 is a diagram illustrating a perspective view of an example frame for the cabin of FIG. 2.

FIG. 3 is a diagram illustrating a perspective view of an example frame 36 for cabin 12. As described above, frame 36 may include a plurality of upright posts (e.g., two A-posts 38, two B-posts 42, and a C-post 40). Floor 32 (not shown in FIG. 3) may include one or more floor beams 48 that define a perimeter of floor 32 and that form a bottom of frame 36. Roof 34 (not shown in FIG. 3) may include one or more roof beams 50 that define a perimeter of roof 34 and that form a top of frame 36. Accordingly, the first terminal end of a post (e.g., an A-post 38, a B-post 42, and/or a C-post 40) may be attached to a floor beam 48 and the second terminal end of the post may be attached to a roof beam 50, and one or more brackets 46 may be attached to the post and the floor beam 48 and/or attached to the post and the roof beam 50, in a manner similar to that described above.

As shown in FIG. 3, C-post 40 may be centrally located at a rear of cabin 12. For example, C-post 40 may be located such that a line of symmetry of C-post 40 corresponds to a center line separating opposing sides of cabin 12 (e.g., a center line of cabin 12 extending from floor 32 to roof 34). C-post 40 may include a C-shaped beam 52 (e.g., a C-shaped tube) and a Y-shaped beam structure 54 that provides a spine of cabin 12. C-shaped beam 52 and Y-shaped beam structure 54 may be attached by welds and/or one or more brackets 46 attached to C-shaped beam 52 and Y-shaped beam structure 54, in a manner similar to that described above. C-shaped beam 52 may extend from floor 32 (e.g., floor beam 48), and Y-shaped beam structure 54 may extend from C-shaped beam 52 to roof 34 (e.g., roof beam 50). C-shaped beam 52 may extend orthogonally from floor beam 48 and define a plane corresponding to a vertical portion of a back wall of cabin 12. Y-shaped beam structure 54 may be angled away from the plane defined by C-shaped beam 52 (see FIG. 5) and meet roof beam 50 at a rear edge of roof 34.

C-shaped beam 52 may include first terminal ends (e.g., attached to floor 32 (e.g., floor beam 48)) of C-post 40 and the Y-shaped beam structure may include second terminal ends (e.g., attached to roof 34 (e.g., roof beam 50)) of C-post 40. The first terminal ends of C-post 40 may terminate at opposing sides of seat 26 (not shown in FIG. 3) and the second terminal ends of C-post 40 also may terminate at opposing sides of seat 26.

As indicated above, FIG. 3 is provided as an example. Other examples may differ from what is described in connection with FIG. 3.

Figure 4:
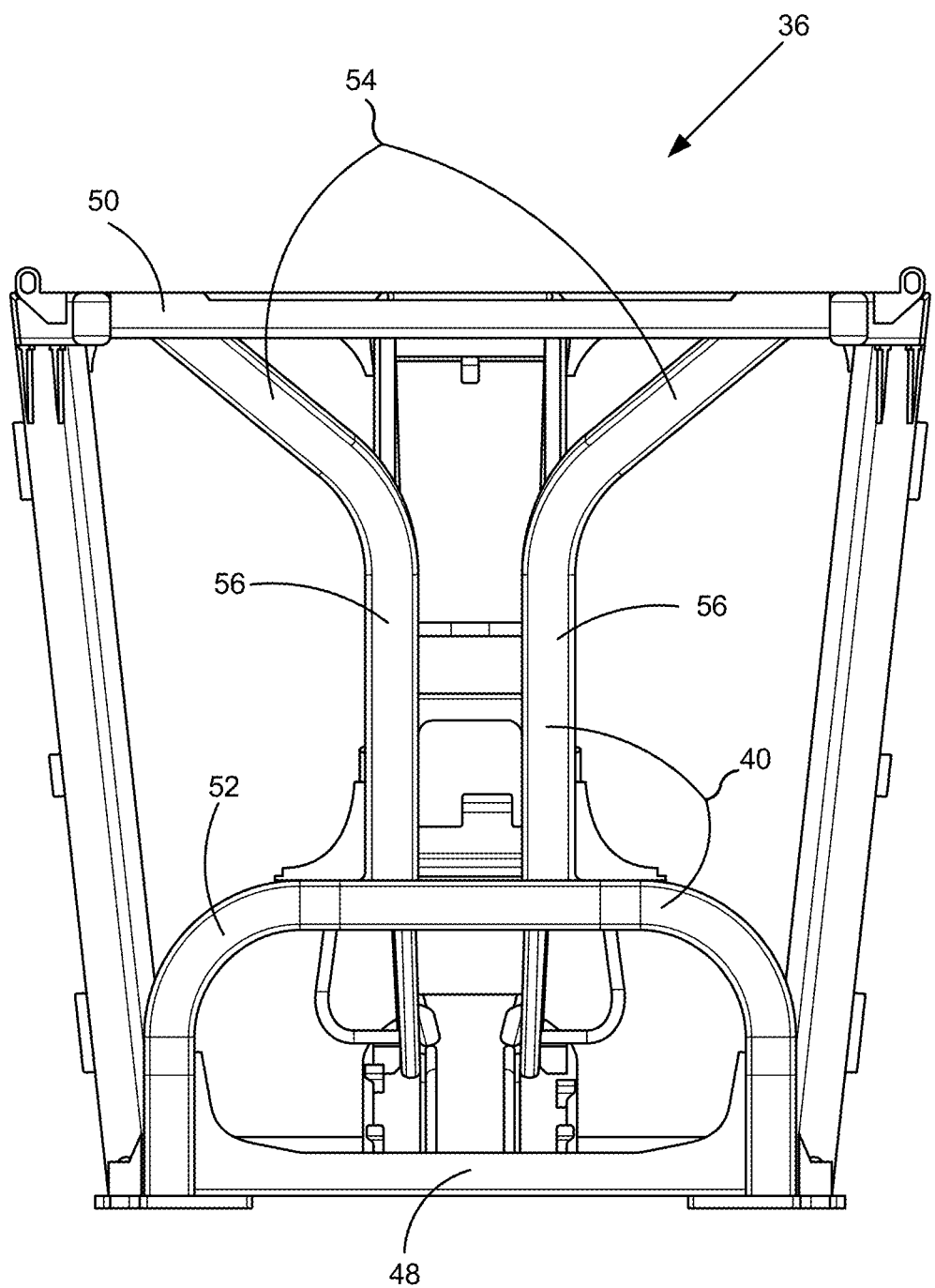
FIG. 4 is a diagram illustrating a back view of the frame of FIG. 3.

FIG. 4 is a diagram illustrating a back view of frame 36. As shown in FIG. 4, C-shaped beam 52 may include the first terminal ends (e.g., two terminal ends) of C-post 40 and a middle section that connects the first terminal ends, thereby forming a C-shape. The middle section may be parallel to floor beam 48 and/or parallel to roof beam 50. Y-shaped beam structure 54 may extend (e.g., orthogonally) from the middle section of C-shaped beam 52.

Y-shaped beam structure 54 may include two spaced beams 56 (e.g., two spaced tubes). A beam 56 of the Y-shaped beam structure may include a vertical lower portion and an angled upper portion that forms an angle with the vertical lower portion between 90-180° (e.g., between 120-150°, between 130-140°, at 135°, and/or the like). The angled upper portion may angle away from a line of symmetry of the two spaced beams (e.g., may angle toward a side of cabin 12). For example, beams 56 may be parallel at a first portion of Y-shaped beam structure 54 (e.g., respective vertical lower portions of beams 56 may be parallel) and beams 56 may diverge from each other at a second portion of Y-shaped beam structure 54 (e.g., respective angled upper portions of beams 56 may diverge), thereby forming a Y-shape.

As indicated above, FIG. 4 is provided as an example. Other examples may differ from what is described in connection with FIG. 4.

Figure 5:
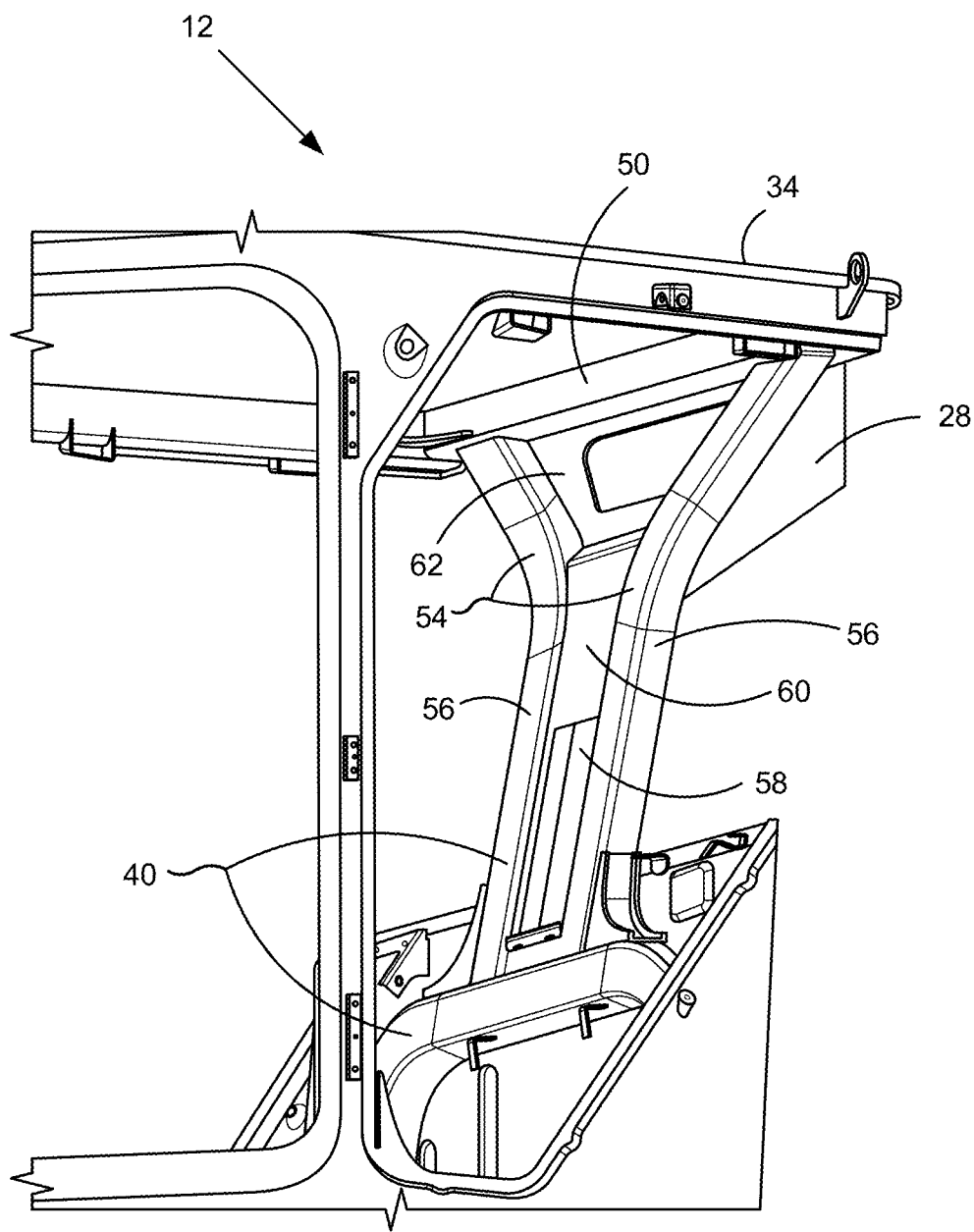
FIG. 5 is a diagram of an example implementation of the cabin of FIG. 2.

FIG. 5 is a diagram of an example implementation of cabin 12. As shown in FIG. 5, C-post 40 (e.g., Y-shaped beam structure 54 of C-post 40) may include an air duct 58 that is configured to transport air between an outside environment and/or HVAC unit 28 and an interior of cabin 12. In some implementations, air duct 58 may provide a conduit for electrical wiring, fluid lines, and/or the like (e.g., electrical wiring and/or fluid lines of HVAC unit 28).

Air duct 58 may include a first plate 60 that is spaced from a second plate 62 such that first plate 60 and second plate 62 form walls of air duct 58. For example, first plate 60 and second plate 62 may be attached to beams 56 (e.g., by welds) so as to define a void space between beams 56 that forms air duct 58. First plate 60 and second plate 62 each may include an opening that permits air to exit air duct 58. Second plate 62 may extend to roof 34 (e.g., roof beam 50), to thereby provide a mounting structure that spans an area between the angled upper portions of beams 56. HVAC unit 28 may be mounted to the mounting structure (e.g., by bolts, welds, clips, and/or the like) of second plate 62 (e.g., mounted to Y-shaped beam structure 54 of C-post 40) so that HVAC unit 28 is located at a rear of cabin 12 and does not extend above roof 34. The mounting structure of second plate 62 may include an opening that permits air to flow between HVAC unit 28 and an interior of cabin 12.

As indicated above, FIG. 5 is provided as an example. Other examples may differ from what is described in connection with FIG. 5.

INDUSTRIAL APPLICABILITY

The disclosed cabin 12 may be used with any machine 10 where a low-profile cabin is desired. In many cases, cabin 12 of machine 10 may extend above other components of machine 10, such that a height of machine 10 is defined by a highest point of cabin 12. Furthermore, a roadway structure (e.g., an overpass, a bridge, a tunnel, and/or the like) or an entrance of a machine storage shed may be associated with a particular height clearance. Accordingly, the low-profile of cabin 12 reduces the height of machine 10, thereby facilitating transport and storage of machine 10, particularly when a roadway structure or an entrance of a machine storage shed has a low height clearance.

The low-profile of cabin 12 is achieved by locating HVAC unit 28 at a rear of cabin 12 rather than on top of roof 34, thereby permitting roof 34 to have a planar top surface. In addition, Y-shaped beam structure 54 of cabin 12 allows for further reduction to the height of machine 10 while providing suitable rollover protection and clear rearward sight lines for an operator of machine 10.

What is claimed is:

1. A cabin for a machine, comprising:
a floor;
a roof;
at least one A-post located at a leading end relative to a forward travel direction of the machine; and
a C-post located at a trailing end opposite the at least one A-post, the C-post having first terminal ends located at the floor and second terminal ends located at the roof, the C-post including:
a C-shaped beam having the first terminal ends, and
a Y-shaped beam structure having the second terminal ends,
the Y-shaped beam structure extending from the C-shaped beam to the roof, and
the Y-shaped beam structure including two spaced beams.

2. The cabin of claim 1, wherein the two spaced beams are parallel at a first portion of the Y-shaped beam structure and the two spaced beams diverge at a second portion of the Y-shaped beam structure.

3. The cabin of claim 1, wherein the Y-shaped beam structure includes an air duct located between the two spaced beams.

4. The cabin of claim 1, wherein the C-shaped beam has a middle section connecting the first terminal ends, wherein the middle section is orthogonal to the two spaced beams.

5. The cabin of claim 1, further comprising:
a seat,
wherein the first terminal ends of the C-post terminate at opposing sides of the seat, and
wherein the second terminal ends of the C-post terminate at opposing sides of the seat.

6. The cabin of claim 1, wherein the floor includes a floor beam, and
wherein the first terminal ends of the C-post are attached to the floor beam.

7. The cabin of claim 1, wherein the roof includes a roof beam, and
wherein the second terminal ends of the C-post are attached to the roof beam.

8. A machine, comprising:
a cabin including a floor, a roof, at least one A-post located at a leading end relative to a forward travel direction of the machine, and a C-post,
the C-post located at a trailing end opposite the at least one A-post, the C-post having first terminal ends located at the floor and second terminal ends located at the roof, the C-post including:
a C-shaped beam having the first terminal ends, and
a Y-shaped beam structure having the second terminal ends,
the Y-shaped beam structure extending from the C-shaped beam to the roof.

9. The machine of claim 8, wherein the roof is planar.

10. The machine of claim 8, wherein the Y-shaped beam structure includes two spaced beams.

11. The machine of claim 8, further comprising:
an HVAC unit mounted to the Y-shaped beam structure.

12. The machine of claim 8, further comprising:
an HVAC unit mounted to a plate of the Y-shaped beam structure,
wherein the plate forms a wall of an air duct.

13. The machine of claim 8, wherein the Y-shaped beam structure is angled away from a plane defined by the C-shaped beam.

14. The machine of claim 8, wherein the cabin further includes at least one B-post between the at least one A-post and the C-post.

15. A motor grader, comprising:
a floor;
a roof; and
a C-post located at a trailing end relative to a forward travel direction of the motor grader, the C-post having first terminal ends located at the floor and second terminal ends located at the roof, the C-post including:
a C-shaped beam having the first terminal ends, and
a Y-shaped beam structure having the second terminal ends,
the Y-shaped beam structure extending from the C-shaped beam to the roof, and
the Y-shaped beam structure including two spaced beams and an air duct located between the two spaced beams.

16. The motor grader of claim 15, wherein the two spaced beams are parallel at a first portion of the Y-shaped beam structure and the two spaced beams diverge at a second portion of the Y-shaped beam structure.

17. The motor grader of claim 15, wherein the air duct includes a first plate and a second plate,
the first plate and the second plate attached to the two spaced beams to define a void space between the two spaced beams.

18. The motor grader of claim 15, wherein the C-shaped beam has a middle section connecting the first terminal ends.

19. The motor grader of claim 18, wherein the Y-shaped beam structure extends from the middle section.

20. The motor grader of claim 15, further comprising:
an HVAC unit mounted to the C-post.

* * * * *